(12) United States Patent
Perkinson et al.

(10) Patent No.: US 8,167,553 B2
(45) Date of Patent: May 1, 2012

(54) ELECTRICAL SYSTEM FOR DRIVING A PROPELLER PITCH CHANGE MECHANISM

(75) Inventors: Robert H. Perkinson, Somers, CT (US); David R. Danielson, Suffield, CT (US)

(73) Assignee: Hamilton Sundstrand Corporation, Rockford, IL (US)

( * ) Notice: Subject to any disclaimer, the term of this patent is extended or adjusted under 35 U.S.C. 154(b) by 529 days.

(21) Appl. No.: 12/481,495

(22) Filed: Jun. 9, 2009

(65) Prior Publication Data

US 2010/0310368 A1 Dec. 9, 2010

(51) Int. Cl.
*F01D 7/00* (2006.01)

(52) U.S. Cl. .......... 416/1; 416/47; 416/48; 416/162; 416/164; 416/166

(58) Field of Classification Search .......... 416/1, 47, 416/48, 154, 155, 162, 164, 166
See application file for complete search history.

(56) References Cited

U.S. PATENT DOCUMENTS

| | | | |
|---|---|---|---|
| 4,523,891 A | 6/1985 | Schwartz et al. | |
| 4,533,296 A | 8/1985 | Duchesneau et al. | |
| 4,810,164 A | 3/1989 | Wright | |
| 4,934,901 A | 6/1990 | Duchesneau | |
| 5,037,271 A * | 8/1991 | Duchesneau et al. | 416/47 |
| 5,042,966 A | 8/1991 | Schwartz et al. | |
| 5,174,718 A * | 12/1992 | Lampeter et al. | 416/48 |
| 5,226,844 A * | 7/1993 | Muller | 440/50 |
| 5,779,446 A * | 7/1998 | Althof et al. | 416/36 |
| 5,836,743 A * | 11/1998 | Carvalho et al. | 416/139 |
| 6,077,040 A | 6/2000 | Pruden et al. | |
| 6,261,062 B1 | 7/2001 | Amerline et al. | |
| 6,422,816 B1 | 7/2002 | Danielson | |
| 6,592,328 B1 | 7/2003 | Cahill | |
| 6,811,376 B2 | 11/2004 | Arel et al. | |
| 6,991,426 B2 | 1/2006 | Pietricola | |

* cited by examiner

*Primary Examiner* — Igor Kershteyn

(74) *Attorney, Agent, or Firm* — Kinney & Lange, P.A.

(57) ABSTRACT

A system adjusts the pitch of a variable pitch propeller having a non-rotating side and a rotating side. The rotating side of the propeller has a hub, a propeller blade mounted to the hub, a propeller shaft that rotates the hub and propeller blade, and an actuation system. The actuation system has a screw and a piston. A motor has a non-rotating component in communication with the non-rotating side of the propeller and a rotating component in communication with the actuation system. When the motor increases speed, the screw rotates and the piston moves laterally in a first axial direction to decrease the pitch of the propeller and, when the motor decreases speed, the screw rotates and the piston moves laterally in a second axial direction to increase the pitch of the propeller.

20 Claims, 2 Drawing Sheets

ELECTRICAL SYSTEM FOR DRIVING A PROPELLER PITCH CHANGE MECHANISM

CROSS-REFERENCE TO RELATED APPLICATION(S)

This is a related application to U.S. patent application Ser. No. 12/481,500, filed on Jun. 9, 2009, entitled "Pitch Change Actuation System for a Counter Rotating Propeller."

BACKGROUND

Variable pitch propeller systems typically include propeller blades mounted to a rotary hub on a rotating side of the propeller system. The rotary hub rotates with a propeller shaft. A propeller pitch change actuator positioned on the rotating side of the propeller system uses hydraulic pressure, electrical current or mechanical motion to adjust the pitch of the propeller. Changing the pitch of these blades requires communication of either mechanical or electrical power or control signals across the interface between a non-rotating side of the propeller (e.g., the airframe or engine) and the rotating side of the propeller (e.g., the propeller pitch change actuator). Typically, mechanical systems such as hydraulic transfer bearings, gear trains, or brush block and slip ring mechanisms have been used to connect the non-rotating side of the propeller system with the rotating side. These systems are often complex systems requiring multiple components. They also can be bulky, particularly the gear trains. These mechanical systems can be prone to leakage and wear, both of which can damage the propeller system. In order to minimize these problems, expensive back-up systems are often used in conjunction with these mechanical systems.

SUMMARY

The present invention is a system for adjusting the pitch of a variable pitch propeller having a non-rotating side and a rotating side. The rotating side of the propeller has a hub, a propeller blade mounted to the hub, a propeller shaft that rotates the hub and propeller blade, and an actuation system. The actuation system has a screw and a piston. A motor has a non-rotating component in communication with the non-rotating side of the propeller and a rotating component in communication with the actuation system. When the motor increases speed, the screw of the actuation system rotates to move the piston laterally in a first axial direction to decrease the pitch of the propeller. When the motor decreases speed, the screw rotates and the piston moves laterally in a second axial direction to increase the pitch of the propeller.

In another aspect of the invention, a method for adjusting the pitch of a variable speed propeller includes driving a motor at a rotational speed. Increasing the rotational speed of the motor rotates a screw and moves a piston in a first axial direction, which decreases the pitch of the variable pitch propeller. Decreasing the rotational speed of the motor rotates the screw and moves the piston in a second axial direction, which increases the pitch of the variable pitch propeller.

DETAILED DESCRIPTION

The present invention uses a motor to allow for communication between a non-rotating side of a variable pitch propeller system and a rotating side of the propeller system. Propellers have blades, a hub, a propeller shaft and an actuator. With the propeller rotating at a constant speed, the motor runs at a constant speed as determined by the gear ratios. When the motor increases in speed, the actuator moves relative to the rotating propeller in a first direction, and the pitch of the blade decreases to increase the speed of the propeller. When the motor decreases in speed, the actuator moves in a second direction and the pitch of the blade decreases to increase the speed of the propeller. The motor, therefore, provides a simple, efficient means of communicating between a rotating side and a non-rotating side and a controllable method for adjusting the pitch of the propeller blade while the propeller blade is rotating.

Figure 1:
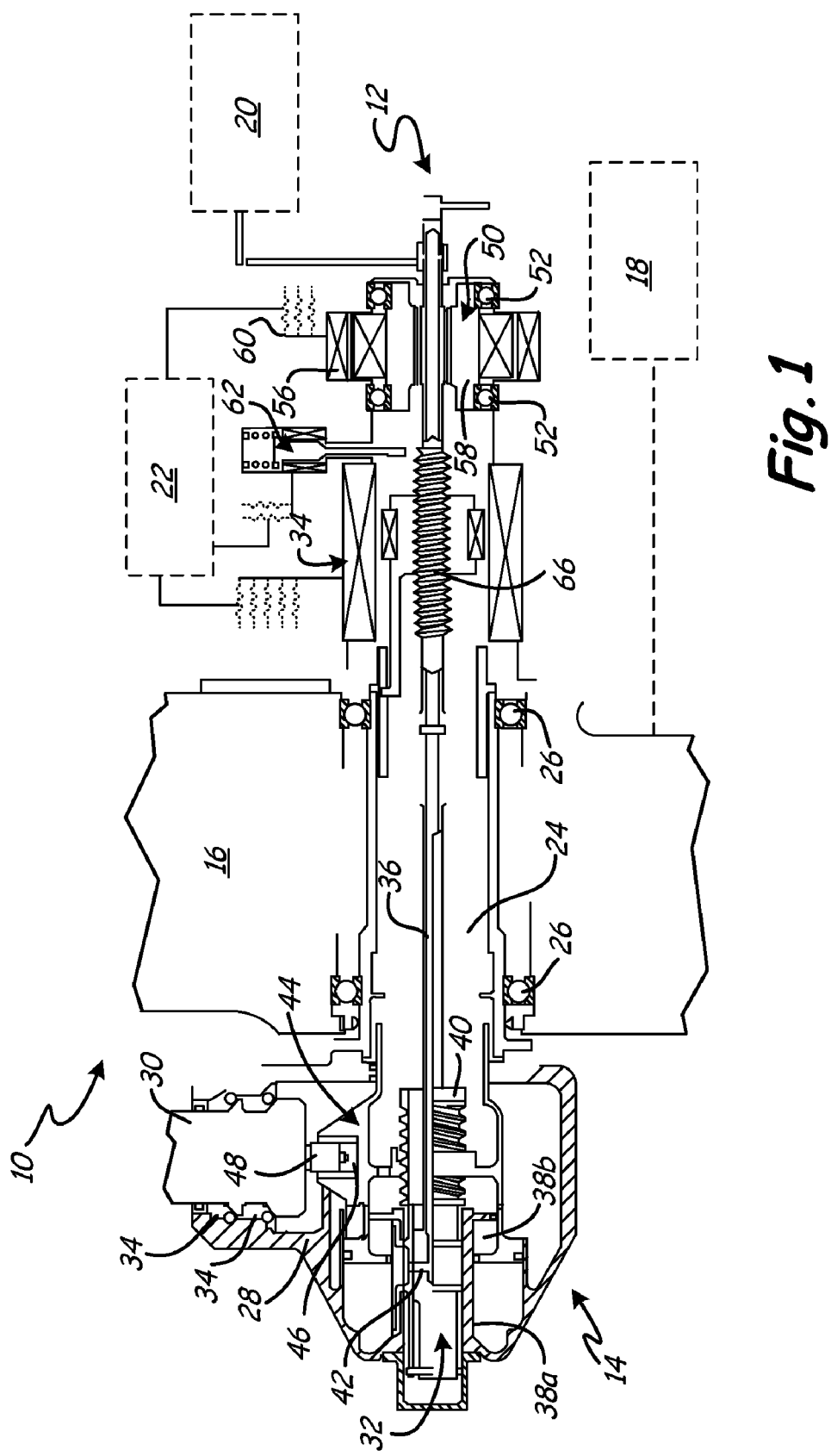
FIG. 1 is a schematic diagram of the invention used with a hydraulic actuation system.
Figure 2:
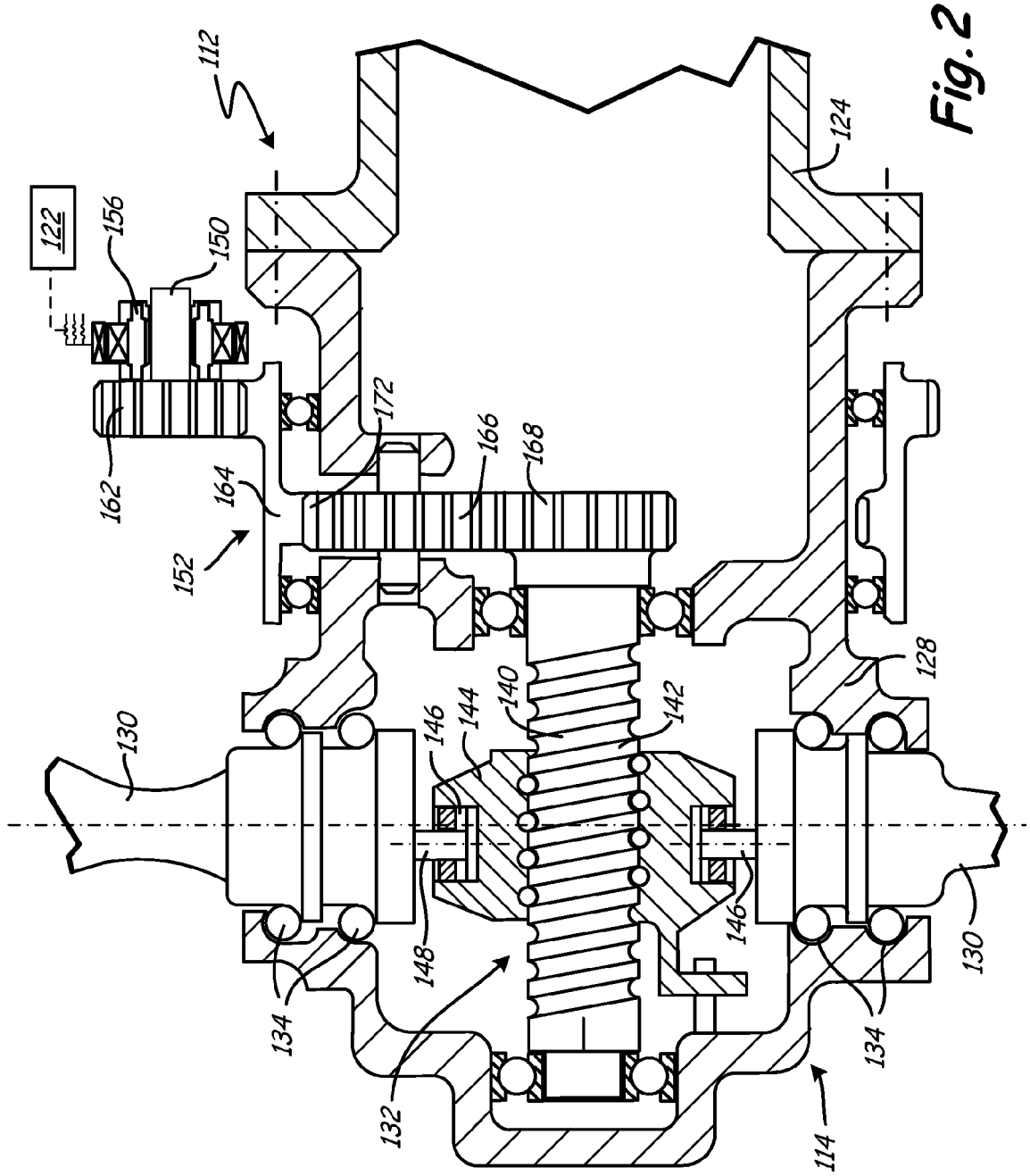
FIG. 2 is a schematic diagram of the invention used with a mechanical actuation system.

FIGS. 1 and 2 each show an embodiment of the invention used with a different type of actuation system. FIG. 1 shows a schematic diagram of a system using the invention with a hydraulic actuation system, while FIG. 2 shows a diagram of the invention used with a mechanical actuation system. A discussion of each of these systems follows, but it can be appreciated that the invention can be used with analogous systems not described herein.

In a first embodiment shown in FIG. 1, propeller system 10 has non-rotating side 12 and rotating side 14. Non-rotating side 12 has stationary components that include gearbox 16, engine 18 that provides rotational input to gearbox 16, hydraulic system 20, electrical supply 22, and controller 23. Rotating side 14 includes propeller shaft 24, which is rotatably driven by gearbox 16 and supported with bearings 26. At an end of propeller shaft 24 is hub 28, which includes a plurality of blades 30 (only one is shown in FIG. 1) that rotate with propeller shaft 24 to provide thrust for propulsion of a vehicle. Hub 28 also includes actuator 32 for adjusting the pitch of blades 30. Blades 30 are mounted to hub 28 on bearings 34, which allow blades 30 to rotate in hub 28 when the pitch is adjusted.

Actuator 32 includes transfer tube 36, a plurality of reservoirs 38a, 38b, pitch lock screw 40, control valve 42, and piston 44. Piston 44 has slots 46 (only one shown in FIG. 1) and each blade 30 has a pin and roller assembly 48 connected at an end of blade 30 and received in a respective slot 46. Transfer tube 36 runs down the center of propeller shaft 24 and is connected at a first end to hydraulics system 20 on non-rotating side 12. Transfer tube 36 conveys hydraulic fluid from hydraulics system 20 along the entire length of propeller shaft 24 to reservoirs 38. Pitch lock screw 40 is connected to transfer tube 36 near a second end of transfer tube 36. Pitch lock screw 40 rotates to translate control valve 42 in a first axial direction or in a second axial direction. Depending on the position of control valve 42, hydraulic fluid is pumped to or exhausted from one of reservoirs 38. When control valve 42 is urged to the left, fluid enters reservoir 38a and pressure builds in reservoir 38a to urge piston 44 to the right. Pin and roller assembly 48 rotates in a first rotational direction to rotate blade 30 and increase the pitch of blade 30. When control valve 42 is urged to the right, fluid enters reservoir 38b and pressure builds in reservoir 38b to urge piston 44 to the left. Pin and roller assembly 48 then rotates in a second rotational direction to rotate blade 30 and decrease the pitch of blade 30.

In order to communicate between non-rotating side 12 and rotating side 14 and turn pitch lock screw 40, pitch change motor 50 is connected to transfer tube 36 between gearbox 16 and hydraulics system 22. Any means of connecting pitch change motor 50 to transfer tube 36 such that pitch change motor 50 rotates with transfer tube 36 is acceptable. In the illustrated embodiment, pitch change motor 50 is mounted in bearings 52 and connected to the rotating side 14 using a splined connection 54 with transfer tube 36. Pitch change motor 50 has a non-rotating component, coil 56, and a rotating component, armature 58. As shown in FIG. 1, non-rotating coil 56 of pitch change motor 50 is connected to non-rotating side 12 with wires 60 to electrical supply 22, which provides the electrical input to pitch change motor 50. Therefore, pitch change motor 50 acts as a built-in interface between non-rotating side 12 and rotating side 14, allowing hydraulic system 22 and pitch lock screw 40 to communicate automatically instead of using gear trains or other complex systems.

Because propeller shaft 24 is already rotating, along with hub 28 and blades 30, pitch lock screw 40 is already rotating. When the rotational speed of pitch change motor 50 increases relative to the rotational speed of propeller shaft 24, torque is applied to pitch lock screw 40 by rotating transfer tube 36. Pitch lock screw 40 then rotates to move control valve 42 to the right. As described above, the pitch of blade 30 decreases, which increases the rotational speed of blade 30. As the rotational speed of pitch change motor 50 decreases, torque in the opposite direction is applied to pitch lock screw 40. Pitch lock screw 40 then rotates to move control valve 42 to the left. The pitch of blade 30 increases, which decreases the rotational speed of blade 30. Therefore, motor 50 provides a simple, efficient way of communicating between rotating side 12 and non-rotating side 14 and a controllable method for adjusting the pitch of propeller blades 30 to operate blades 30 at a given speed.

Propeller system 10 may include low pitch stop solenoid 62 and linear variable differential transformer (LVDT) 64, which are mounted on propeller shaft 20 between motor 50 and gearbox 16, connected to electrical supply 22, and controlled by controller 23. Low pitch stop solenoid 62 and linear variable differential transformer (LVDT) 64 allow for controlled pitch adjustment. Low pitch stop solenoid 62 is typically used as a safety against the pitch going below a desired β-value, and linear variable differential transformer (LVDT) 64 has a screw 66 that runs a set of magnets 68 back and forth to measure the angle of propeller blade 30.

FIG. 2 shows a second embodiment of the invention, where the invention is used in combination with a mechanical actuation system. Instead of using hydraulics, as shown in FIG. 1, this system uses a gear mechanism to move the actuator and adjust the pitch of the propeller blade.

As described with the first embodiment, propeller system propeller system 110 has non-rotating side 112 and rotating side 114. Non-rotating side 112 has an electrical supply 122, controller 123, and an engine (not shown). Rotating side 114 includes propeller shaft 124, which is rotatably driven by the engine (not shown). At an end of propeller shaft 124 is hub 128, which includes a plurality of blades 130 that rotate with propeller shaft 124 to provide thrust for propulsion of a vehicle. Hub 128 also includes actuator 132 for adjusting the pitch of blades 130. Blades 130 are mounted to hub 128 on bearings 134, which allow blade 30 to rotate in the hub when the pitch is adjusted.

Actuator 132 includes ball screw 140, which has threaded portion 142, and nut 144 that translates along threaded portion 142 as ball screw 140 is rotated in a given direction. Nut 144 has slots 146, and blades 130 each have pin and roller assembly 148 connected at an end of blade 130 and received in respective slot 146. Nut 144 acts as the piston in FIG. 2. When nut 144 is urged to the left, pin and roller assembly 148 rotate the blade 130 about its pitch change axis in a first rotational direction to decrease the pitch. When nut 144 is urged to the right, pin and roller assembly 148 rotate the blade 130 in a second rotational direction to increase the pitch.

In order to rotate ball screw 140 and change the pitch of blade 130, pitch change motor 150 drives a gear train 152 that is connected to ball screw 140. Pitch change motor 150 has a non-rotating component, coil 154, and a rotating component, armature 156. Coil 154 is connected on non-rotating side 112 to electrical supply 122, which provides the electrical input to pitch change motor 150. Armature 156 provides rotational input for gear train 152, which has pinion 162 connected to motor 150, ring gear 164, intermediate gear 166, and gear 168 that is attached to ball screw 140. Pinion 162 is mated with ring gear 164 that has teeth on outer surface 170 and teeth on inner surface 172. Pinion 162 mates with the teeth on outer surface 170 of ring gear 164, and an intermediate gear 166 mates with the teeth on inner surface 172. Intermediate gear 166 then mates with a gear 168 connected with ball screw 140. Therefore, as pinion 162 rotates at an input speed provided by motor 150, ring gear 164 rotates proportionally with pinion 162, intermediate gear 166 rotates proportionally with ring gear 164, and gear 168 rotates proportionally with intermediate gear 166 to rotate ball screw 140.

When pitch change motor 150 spins at the speed it takes to keep the ring gear from rotating ball screw 140, the pitch of blades 130 does not change. When the rotational speed of pitch change motor 150 increases, gear train 152 turns gear 168, which rotates threaded portion 144 of ball screw 140 and nut 144 moves to the left. When nut 144 is urged in the first axial direction, pin and roller assembly 148 rotate blades 130 about their pitch change axis in a first rotational direction as described above, and the rotational speed of blades 130 then increases. When the rotational speed of pitch change motor 150 decreases, gear train 152 turns gear 168 at a slower rate and rotates threaded portion 144 of ball screw 140 so that nut 144 moves to the right. When nut 144 is urged in the second axial direction, pin and roller assembly 148 rotate in a second rotational direction to increase the pitch of blade 130. The rotational speed of blades 130 then decreases.

As discussed above, this invention provides a simple, efficient means of communicating between a rotating side and a non-rotating side and a controllable method for adjusting the pitch of the propeller blade while the propeller blade is rotating. The invention also provides an automatic speed governing feature for the propeller system 10, 110. If the rotational speed of the pitch change motor 50, 150 is held fixed, any change in the rotational speed of the propeller blades 30, 130, due to load change or engine power change, will be compensated for by an automatic change in propeller blade angle as the rotational speed of the propeller shaft 24, 124 increases or decreases, such that the rotational speed of the propeller blades 30, 130 will again be returned to the desired constant speed. In other words, if the rotational speed of the pitch change motor 50, 150 remains constant, then the pitch of the propeller blades 30, 130 will be proportionally adjusted in order to counter any increase or decrease in rotational speed of propeller shaft 24, 124. As the rotational speed of the propeller shaft 24, 124 decreases, the blades 30, 130 will be driven to decrease pitch thus causing the rotational speed of the propeller blades 30, 130 to increase back to the desired speed. The opposite would also be true; as the rotational speed of the propeller shaft 24, 124 increases, the pitch of blades 30, 130 will increase causing the rotational speed of the propeller blades 30, 130 to decrease back to the desired speed. Thus, by controlling the speed of pitch change motor 50, 150, the propeller system 10 has a self-governing feature.

The propeller system 10, 110 can be a single rotating propeller having only one set of propeller blades or a counter-rotating propeller system having multiple sets of propeller blades. Although any type of motor could be used, motors 50, 150 are preferably permanent magnet DC motors. Other types of motors, such as AC motors or hydraulic motors, would also be acceptable.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for adjusting the pitch of a variable pitch propeller, the system comprising:
   a non-rotating side of the propeller;
   a rotating side of the propeller having a hub, a propeller blade mounted to the hub, a propeller shaft that rotates the hub and propeller blade, and an actuation system having a screw and a piston; and
   a motor having a non-rotating component in communication with the non-rotating side and a rotating component in communication with the actuation system, wherein when the motor increases speed, the screw rotates and the piston moves laterally in a first axial direction to decrease the pitch of the propeller and, when the motor decreases speed, the screw rotates and the piston moves laterally in a second axial direction to increase the pitch of the propeller.

2. The system of claim 1, wherein the blade is rotatably connected with the piston such that when the piston moves laterally in a first axial direction, the blade rotates in a first rotational direction, and when the piston moves laterally in the second axial direction, the blade rotates in a second rotational direction.

3. The system of claim 1, wherein the motor comprises a hydraulic motor.

4. The system of claim 1, wherein the motor comprises an electric motor.

5. The system of claim 4, wherein the non-rotating side of the propeller has an electrical supply and controller, and the non-rotating component of the motor is connected with the electrical supply and controller.

6. The system of claim 5, wherein the non-rotating component comprises a stator coil.

7. The system of claim 1, wherein the actuation system is a hydraulic actuation system.

8. The system of claim 7, the hydraulic actuation system comprising:
   a hydraulic fluid source;
   reservoirs in the hub;
   a tube for transferring hydraulic fluid from the hydraulic fluid source to the reservoirs, the tube having a first end and a second end, wherein the rotating component of the motor is connected near the first end of the tube and the screw is connected near the second end of the tube; and
   a control valve in communication with the screw and the reservoirs for controlling fluid transferred to the reservoirs.

9. The system of claim 8, wherein when the motor decreases speed, the screw rotates to move the control valve in the first axial direction, pressure increases in a first reservoir, and the piston moves in the second axial direction to increase the pitch of the propeller; and when the motor increases speed, the screw rotates to move the control valve in the second axial direction, pressure increases in a second reservoir to move the piston in the first axial direction to decrease the pitch of the propeller.

10. The system of claim 8, wherein the tube is connected to the rotating component of the motor with a splined connection such that the tube rotates together with the motor.

11. The system of claim 1, wherein the actuation system is a mechanical actuation system.

12. The system of claim 11, wherein the mechanical actuation system includes a gear train comprising:
   a pinion driven by the rotating component of the motor at an input speed; and
   a gear attached to the screw, the gear driven at a speed proportional to the input speed of the pinion.

13. The system of claim 12, wherein the gear train further comprises:
   a ring gear that meshes with the pinion gear; and
   an intermediate gear that meshes with the ring gear and the gear attached to the screw.

14. The system of claim 12, wherein the screw is a ball screw having a nut and a threaded portion, wherein the screw is attached to the gear at the threaded portion and wherein the nut is the piston.

15. A method of adjusting the pitch of a variable pitch propeller having a rotating side and a non-rotating side, the method comprising:
   driving a motor at a rotational speed, the motor having non-rotating component in communication with the non-rotating side and a rotating component in communication with an actuation system on the rotating side, the actuation system having a screw and a piston;
   increasing the rotational speed of the motor to rotate the screw and move the piston in a first axial direction, which decreases the pitch of the variable pitch propeller; and
   decreasing the rotational speed of the motor to rotate the screw and move the piston in a second axial direction, which increases the pitch of the variable pitch propeller.

16. The method of claim 15, wherein the actuation system is a hydraulic actuation system.

17. The method of claim 16, wherein the hydraulic actuation system has a control valve such that, when the rotational speed of the motor is increased, the control valve moves in the second axial direction and fluid pressure moves the piston in the first axial direction; and, when the rotational speed of the motor is decreased, the control valve moves in a first axial direction to fluid pressure moves the piston in the second axial direction.

18. The method of claim 15, wherein the actuation system is a mechanical actuation system.

19. The method of claim 18, wherein the mechanical actuation system comprises a ball screw having a threaded portion and a nut that acts as the piston.

20. The method of claim 1, further comprising:
   driving the motor at a constant rotational speed in order to compensate for any changes in rotational speed of the rotating side of the variable pitch propeller by automatically adjusting the pitch to maintain constant speed of the variable pitch propeller.

* * * * *